United States Patent
Hu et al.

(10) Patent No.: US 9,336,609 B2
(45) Date of Patent: May 10, 2016

(54) IMAGE AND MESSAGE ENCODING SYSTEM, ENCODING METHOD, DECODING SYSTEM AND DECODING METHOD

(71) Applicant: INDUSTRIAL TECHNOLOGY RESEARCH INSTITUTE, Chutung, Hsinchu (TW)

(72) Inventors: Jwu-Sheng Hu, Hsinchu (TW); Jiun-Yan Chen, Tuku Township, Yunlin County (TW); Hsin-Yi Lin, Taichung (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 383 days.

(21) Appl. No.: 13/889,104

(22) Filed: May 7, 2013

(65) Prior Publication Data

US 2014/0161366 A1  Jun. 12, 2014

(30) Foreign Application Priority Data

Dec. 7, 2012  (TW) .............................. 101146200 A

(51) Int. Cl.
| | |
|---|---|
| G06T 9/00 | (2006.01) |
| H04N 19/27 | (2014.01) |
| H04N 19/85 | (2014.01) |
| H04N 19/17 | (2014.01) |

(52) U.S. Cl.
CPC *G06T 9/00* (2013.01); *H04N 19/27* (2014.11); *H04N 19/85* (2014.11); *H04N 19/17* (2014.11)

(58) Field of Classification Search
USPC ........................................ 382/100, 232–233
See application file for complete search history.

(56) References Cited

U.S. PATENT DOCUMENTS

| | | | |
|---|---|---|---|
| 5,706,103 A * | 1/1998 | Matoba et al. ........... | 358/426.03 |
| 7,187,476 B2 | 3/2007 | Umeda et al. | |
| 7,222,306 B2 * | 5/2007 | Kaasila et al. ................ | 715/801 |
| 7,773,266 B2 | 8/2010 | Umeda et al. | |
| 8,184,337 B2 | 5/2012 | Sakai | |
| 8,280,194 B2 * | 10/2012 | Wong et al. ................... | 382/299 |
| 8,488,893 B2 * | 7/2013 | Itoh ............................... | 382/240 |
| 8,627,206 B2 * | 1/2014 | Ogikubo ....................... | 715/719 |

(Continued)

FOREIGN PATENT DOCUMENTS

| | | |
|---|---|---|
| CA | 2748836 | 2/2012 |
| EP | 0 883 300 A2 | 12/1998 |

(Continued)

OTHER PUBLICATIONS

Xie, et al., "A Robust High Capacity Information Hiding Algorithm Based on DCT High Frequency Domain", Computer Netwoek and Multimedia Technology, 2009, 4 pages.

(Continued)

*Primary Examiner* — Ishrat I Sherali
(74) *Attorney, Agent, or Firm* — Muncy, Geissler, Olds & Lowe, P.C.

(57) ABSTRACT

An image and message encoding system, encoding method, decoding system and decoding method are provided. The encoding method includes the following steps. An original image having a first resolution is provided. A message data is provided. The original image and the message data are combined to be an integrated image having a second resolution. The second resolution is greater than the first resolution.

22 Claims, 4 Drawing Sheets

(56) References Cited

U.S. PATENT DOCUMENTS

| | | | |
|---|---|---|---|
| 8,934,042 B2* | 1/2015 | Kim | 348/333.05 |
| 2003/0063319 A1 | 4/2003 | Umeda et al. | |
| 2006/0033820 A1* | 2/2006 | Honda et al. | 348/218.1 |
| 2006/0114987 A1 | 6/2006 | Roman | |
| 2007/0053020 A1* | 3/2007 | Kubo et al. | 358/498 |
| 2007/0076262 A1 | 4/2007 | Umeda et al. | |
| 2007/0160360 A1* | 7/2007 | Mowry | 396/311 |
| 2008/0024841 A1* | 1/2008 | Hattori | 358/498 |
| 2008/0196076 A1* | 8/2008 | Shatz et al. | 725/116 |
| 2009/0160875 A1* | 6/2009 | Chikyu | 345/660 |
| 2009/0231630 A1 | 9/2009 | Sakai | |
| 2010/0158410 A1* | 6/2010 | Kusakabe | 382/284 |
| 2012/0047424 A1 | 2/2012 | Rothschild | |
| 2012/0098861 A1 | 4/2012 | Mei et al. | |
| 2012/0099841 A1 | 4/2012 | Lee et al. | |

FOREIGN PATENT DOCUMENTS

| | | |
|---|---|---|
| JP | 2009225181 | 10/2009 |
| KR | 10-2011-0068057 A | 6/2011 |
| SG | 177037 | 1/2012 |
| TW | 572298 | 1/2004 |
| TW | 200426672 A | 12/2004 |
| TW | 200834369 | 8/2008 |
| TW | 201135663 | 10/2011 |
| TW | 201238360 A1 | 9/2012 |

OTHER PUBLICATIONS

Kahn et al., "Neural Network Based Steganography Algorithm for Still Images", Emerging Trends in Robotics and Communication Technologies, 2010, p. 46-51.

Gopalan, "A One-Dimensional Technique for Embedding Data in A JPEG Color Image", Circuits and Systems, 2006, p. 948-951.

Ridzon, et al., "Using DCT coefficients Flipping for Information Hiding in Still Images", 20$^{th}$ International Conference Radioelektronika, 2010, 4 pages.

Lai et al., "Secret-Fragment-Visible Mosiac Image—A New Computer Art and Its Application to Information Hiding", IEEE Transactions on Information Forensics and Security, vol. 6, No. 3, Sep. 2011, p. 936-945.

Lee et al., "A Secret-Sharing-Based Method for Authentication of Grayscale Document Images via the Use of the PNG Image With a Data Repair Capability" IEEE Transactions on Image Processing, vol. 21, No. 1, Jan. 2012, p. 207-218.

* cited by examiner

IMAGE AND MESSAGE ENCODING SYSTEM, ENCODING METHOD, DECODING SYSTEM AND DECODING METHOD

This application claims the benefit of Taiwan application Serial No. 101146200, filed Dec. 7, 2012, the disclosure of which is incorporated by reference herein in its entirety.

TECHNICAL FIELD

The disclosed embodiments relate in general to an encoding system, encoding method, decoding system and decoding method, and more particularly to an image and message encoding system, encoding method, decoding system and decoding method.

BACKGROUND

In image processing techniques, the number of designs requiring real-time computations is ever-growing. When replying data generated from real-time computations and original image data back to a calculator for other processes, a synchronous transmission between the original data and the data generated from real-time computations needs to be fulfilled.

SUMMARY

The disclosure is directed to an image and message encoding system, encoding method, decoding system and decoding method.

According to one embodiment, an image and message encoding method is provided. The encoding method includes the following steps. An original image having a first resolution is provided. A message data is provided. The original image and the message data are combined to be an integrated image having a second resolution. The second resolution is greater than the first resolution.

According to another embodiment, an image and message encoding system is provided. The encoding system includes an image capturing unit, a data providing unit and an encoding unit. The image capturing unit provides an original image having a first resolution. The data providing unit provides a message data. The encoding unit combines the original image and the message data to be an integrated image having a second resolution. The second resolution is greater than the first resolution.

According to an alternative embodiment, an image and message decoding method is provided. The decoding method includes the following steps an integrated image having a second resolution is received. An original image and a message data are retrieved from the integrated image. The original image has a first resolution. The second resolution is greater than the first resolution.

According to yet another embodiment, an image and message decoding system is provided. The decoding system includes an image inputting unit and a decoding unit. The image inputting unit receives an integrated image having a second resolution. The decoding unit retrieves an original image and a message data from the integrated image. The original image has a first resolution. The second resolution is greater than the first resolution.

Figure 1:
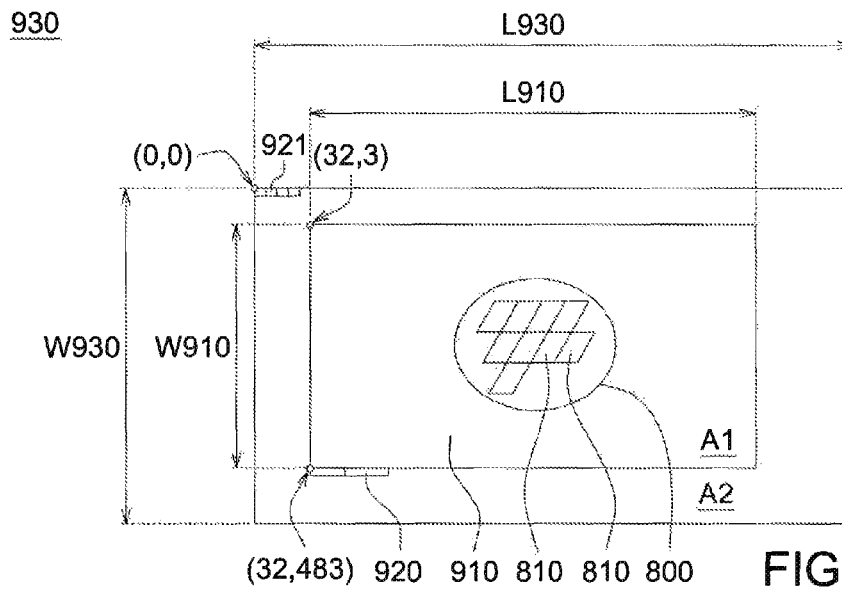
FIG. 1 is a schematic diagram of an integrated image resulted from a combination of an original image and a message data.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

FIG. 1 shows a schematic diagram of an integrated image 930 resulted from a combination of an original image 910 and a message data 920. For example, the original image 910 is a detection image of a wafer 800. The wafer 800 includes a plurality of dies 810. For example, the message data 920 is position coordinates at an upper-left corner of each die 810. As the original image 910 is an image, an original appearance of the original image 910 can be displayed in the integrated image 930. The message data 920 may be a combination of numerals and texts, and is encoded in the integrated image 930 through an appropriate encoding method in the embodiment. As the integrated image 930 is displayed in form of an image, the message data 920 may appear in an irregular appearance similar to mosaic noises. When the original image 910 and the message data 920 are encoded to be one integrated image 930, the original image 910 and the message data 920 can be synchronously transmitted through one image transmission channel.

Figure 2:
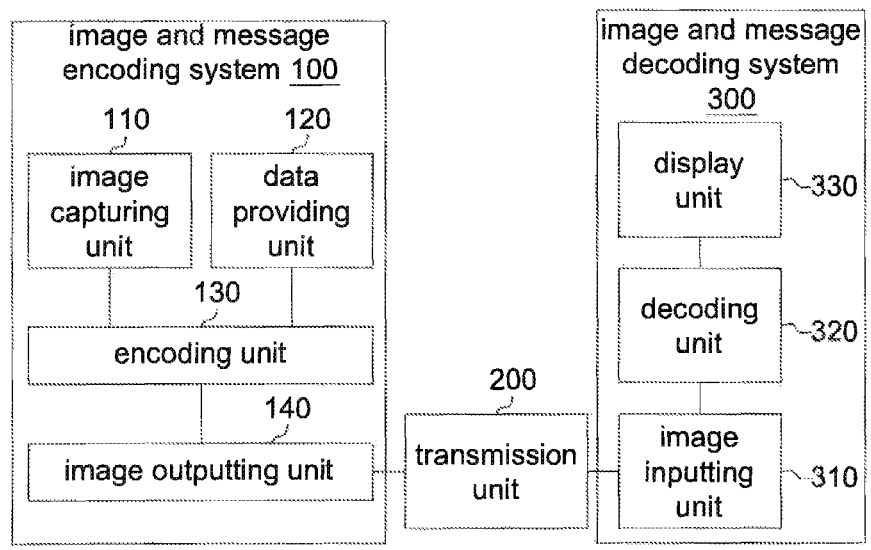
FIG. 2 is a schematic diagram of an image and message encoding system, a transmission unit, and an image and message decoding system.

FIG. 2 shows a schematic diagram of an image and message encoding system 100, a transmission unit 200 and an image and message decoding system 300. The image and message encoding system 100 can combine the original image 910 and the message data 920 to be the integrated image 930. The image and message decoding system 300 can retrieve the original image 910 and the message data 920 from the integrated image 930. The image and message encoding system 100 and the image and message decoding system 300 are both implemented by computing techniques.

The image and message encoding system 100 includes an image capturing unit 110, a data providing unit 120, an encoding unit 130 and an image outputting unit 140. The image capturing unit 110 provides various images. For example, the image capturing unit 110 can be a video camera, a camera, a transmission line connected to a (video) camera, or a transmission line electrically connected to a hard drive. The encoding unit 130 is electrically connected to the image capturing unit 110, the data providing unit 120 and the image outputting unit 140.

The data providing unit 120 provides various kinds of data. For example, the data providing unit 120 can be a hard drive, a memory device, an optical disk, a transmission line connected to a hard drive, or an input device.

The encoding unit 130 performs various encoding procedures. For example, the encoding unit 130 can be a dedicated hardware circuit or a processing chip.

The image outputting unit 140 outputs various kinds of image data. For example, the image outputting unit 140 can be a Digital Visual Interface (DVI), Video Graphics Array (VGA), Peripheral Component Interconnect (PCI), PCI-Express (PCI-e), Universal Serial Bus (USB), or Ethernet interface.

The transmission unit 200 transmits various kinds of data. For example, the transmission unit 200 can be a DVI, VGA, PCI, PCI-e, USB or Ethernet transmission line.

The image and message decoding system 300 includes an image inputting unit 310, a decoding unit 320 and a display unit 330. The image inputting unit 310 inputs various kinds of data. For example, the image inputting unit 310 can be a DVI, VGA, PCI, PCI-e, USB or Ethernet interface. The decoding unit 320 is electrically connected to the image inputting unit 310 and the display unit 330. The transmission unit 200 is electrically connected to the image outputting unit 140 and the image inputting unit 310.

The decoding unit 320 performs various kinds of decoding procedures. For example, the decoding unit 320 can be a hardware circuit board or a processing chip.

The display unit 330 displays various kinds of information. For example, the display unit 330 can be a display panel, a projector or a printer.

Figure 3:
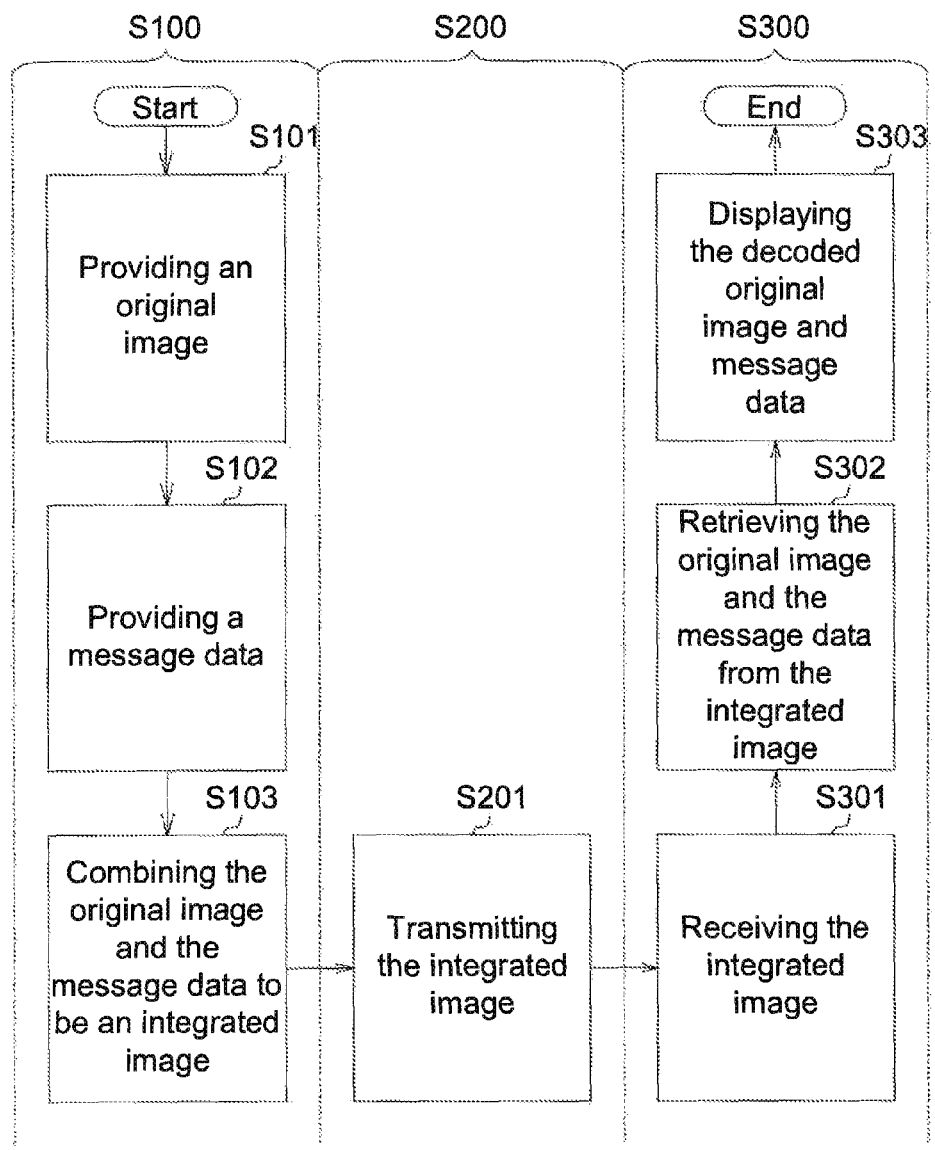
FIG. 3 is a flowchart of an image and message encoding method and an image and message decoding method.

Operation details of the image and message encoding system 100, the transmission unit 200 and the image and message decoding system 300 are to be described with reference of a flowchart below. FIG. 3 shows a flowchart of an image and message encoding method and an image and message decoding method. Referring to FIG. 3, a stage S100 is the image and message encoding method performed by the image and message encoding system 100; a stage S200 is a transmission step performed by the transmission unit 200; a stage S300 is the image and message decoding method performed by the image and message decoding system 300.

In step S101, the image capturing unit 110 provides an original image 910. The original image 910 has a first resolution, e.g., 640*480. Taking FIG. 1 for example, the original image 910 is a detection image of the wafer 800. The wafer 800 includes nine dies 810. A subsequent analysis can be performed after obtaining the original image 910.

In step S102, the data providing unit 120 provides a message data 920. The message data 920 may be specific information obtained from performing predetermined analysis on the original image 910, information of aperture, shutter or sensitivity (e.g., an ISO value) already present in the image capturing unit 110, or text information entered by a user. The message data 920 is usually transmitted jointly with the original image 910 to another calculator for advanced analysis.

In step S103, the encoding unit 130 combines the original image 910 and the message data 920 to be the integrated image 930. The integrated image 930 has a second resolution, e.g., 800*600. The second resolution of the integrated image 930 is greater than the first resolution of the original image 910, in a way that extra pixels in the integrated image 930 may be utilized for recording the message information 920.

Referring to FIG. 1, the integrated image 930 has a length L930 and a width W930 respectively greater than a length L910 and a width W910 of the original image 910. Thus, the original image 910 can be completely embedded into the integrated image 930.

As shown in FIG. 1, the integrated image 930 has a first area A1 and a second area A2. The first area A1 and the second area A2 are non-overlapping. The original image 910 is encoded in the first area A1, and the message data 920 is encoded in the second area A2. The first area A1 presents the appearance of the original image 910, and a part in the second area A2 recording the message data 920 bears an appearance with irregular grayscale values similar to mosaic noises. More specifically, the other part of the second area A2 appears mostly as black (or white) without any grayscale changes.

As shown in FIG. 1, the second area A2 is disposed outside the first area A1, for example, surrounds the first area A1. As the message data 920 recorded in the second area A2 can be arbitrarily divided, the second area A2 may be arranged as encircling the first area A1. The original image 910 recorded in the first area A1 may not be split, and is thus centralized in the first area A1.

Figure 4:
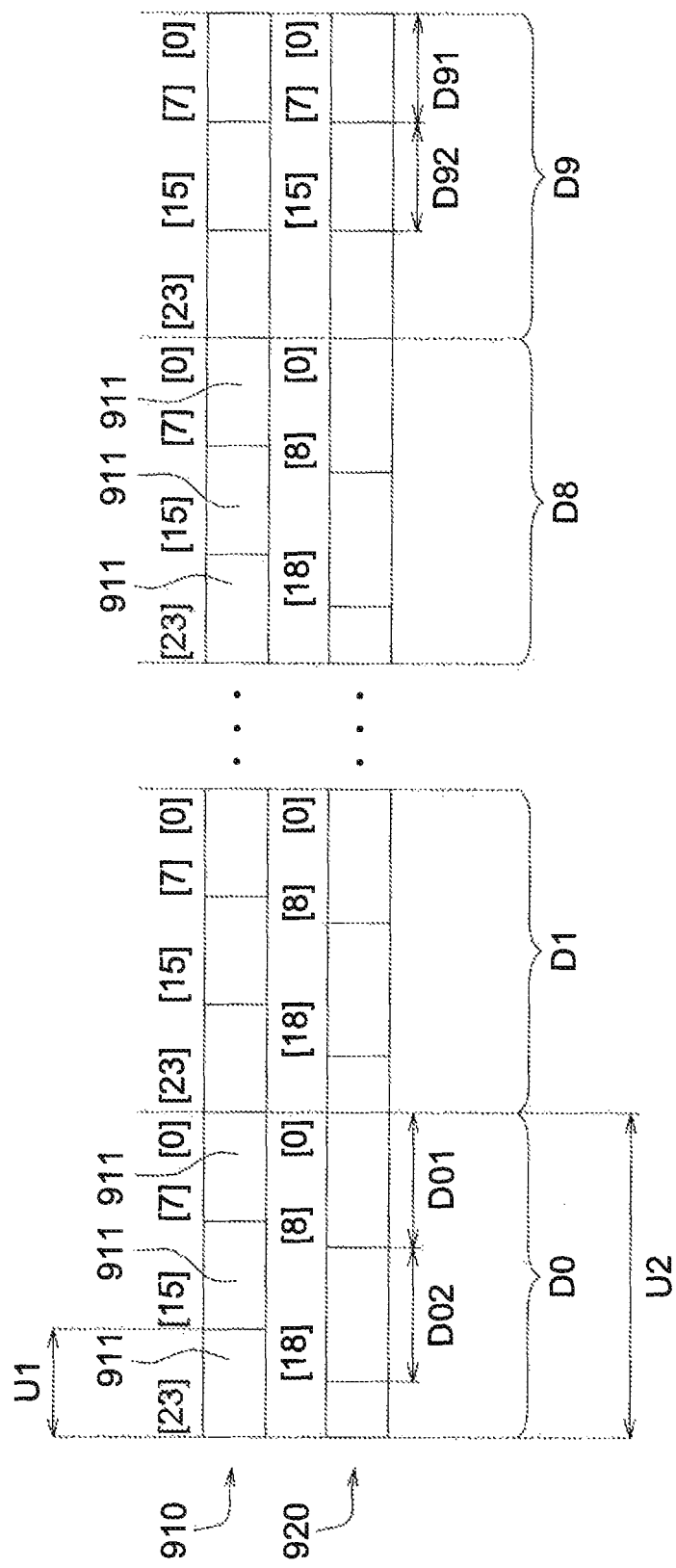
FIG. 4 is an encoding method of a message data.

FIG. 4 shows an encoding method of the message data 920. The original image 910 has a plurality of image pixels 911, each consisted of a red color component, a green color component and a blue color component. Each fundamental color component of each pixel 911 is expressed in 8 bits (each recording "0" or "1") for recording the color depth value between 0 and 255. Therefore, a length U1 of each color fundamental pixel in the original image 910 is 8 bits.

Each unit of the message data 920 adopts a length U2 of 24 bits. Data blocks D0 to D8 record starting coordinates of the $1^{st}$ to $9^{th}$ dies 810, and a data block D9 records the length and width of each of the dies 810.

Each of the data blocks D0 to D9 is divided into several sub-blocks. Taking the data block D0 for example, the data block D0 includes sub-blocks D01 and D02. 9 bits of the sub-block D01 record the y-axis starting coordinate of the $1^{st}$ die 810, 10 bits of the sub-block D02 records the x-axis starting coordinate of the $1^{st}$ die 810, and the remaining 5 bits are recorded as "0" (or "1"). Taking the data block D9 for example, the data block D9 includes sub-blocks D91 and D92. 8 bits of the sub-block D91 record the length of the dies 810, 8 bits of the sub-block D92 record the width of the dies 810, and the remaining 8 bits are recorded as "0" (or "1").

In the message data 920, regardless of how the sub-blocks of each of the data blocks D0 to D9 are arranged, every 8 bits serve as a depth value of a fundamental color component, with the depth value being displayed in the integrated image 930. Therefore, in the integrated image 930, the message data 920 may bear an irregular appearance similar to mosaic noises.

In conclusion, the length U2 (e.g., 24 bits) of each unit of the message data 920 is an integral multiple (e.g., three times) of the length U1 (e.g., 8 bits) of each fundamental color component (e.g., a red, green or blue color component) of the original image 910. With the design of the integral multiple, decoding computation complexities of the message data 920 can be lowered.

In an embodiment, the message data 920 may start encoding from a starting column of a next row of the original image 910. In an alternative embodiment, the message data 920 may also be encoded at a starting position of the integrated image 930.

In an embodiment, a decoding protocol may be preset. Thus, the image and message decoding system 300 may learn the decoding protocol beforehand, and can then identify the original image 910 and the message data 920 from corresponding positions.

In an alternative embodiment, the decoding unit 130 may establish a header data 921. The header data 921 records information of the original image 910 and the message data 920. For example, as shown in FIG. 1, the header data 921 may be encoded to record a starting position of the integrated image 930. The header data 921 may record a starting position/length/width of the original image 910, a starting position/length of the message data 920, and an encoding rule of the message data 920. As such, even when the decoding protocol is not preset, the image and message decoding system 300 is still able to identify the original image 910 and the message data 920 according to the header data 921.

As shown in FIG. 3, the stage S200 is performed after the encoding unit 130 completes the integrated image 930. In step S201, the image outputting unit 140 outputs the integrated image 930, and transmits the integrated image 930 via the transmission unit 200 to the image inputting unit 310. In this step, since the message data 920 is encoded in the integrated image 930, instead of also requiring an additional data transmission channel for transmitting the message data 920, only one image transmission channel is required for transmitting the integrated image 930. Further, the original image 910 and the message data 920 integrated into the integrated image 930 can be simultaneously transmitted utilizing one-time transmission.

In step S301 of the stage S300, the image inputting unit 310 receives the integrated image 930.

In step S302, the decoding unit 320 retrieves the original image 910 and the message data 920 from the integrated image 930. In an embodiment, the decoding unit 320 may obtain the information of the original image 910, the information of the message data 920 and the decoding rule of the message data 920 according to a pre-learned decoding protocol. In an alternative embodiment, the decoding unit 320 may obtain the information of the original image 910, the information of the message data 920 and the decoding rule of the message data 920 according to the header data 921.

In step S303, the display unit 330 respectively displays the decoded original image 910 and message data 920.

In the embodiment, the transmission unit 200 may be a digital transmission channel, e.g., a DVI transmission line. In another embodiment, the transmission unit 200 may be an analog transmission channel, e.g., a VGA transmission line.

When the transmission unit 200 is implemented by an analog transmission channel, a digital-to-analog conversion needs to be performed before the analog transmission channel, and an analog-to-digital conversion needs to be performed after the analog transmission channel. In general, the conversion between analog and digital forms may result a partial binary value distortion. Particularly in the message data 920, even a minute distortion may still cause an immense difference between the decoded message data 920 and the original image data 910. Hence, the encoding method of the message data 920 is made quite challenging when the transmission unit 200 is implemented by an analog transmission channel.

Figure 5:
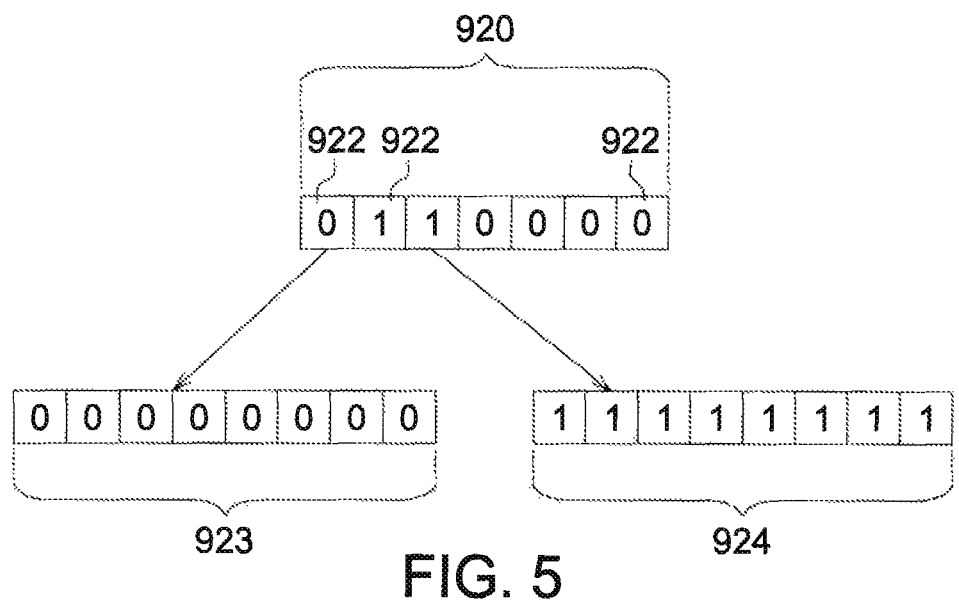
FIG. 5 is another encoding method of a message data.

FIG. 5 shows another encoding method of the message data 920. To implement the transmission unit 200 by an analog transmission channel, in step S103, the encoding unit 130 may convert the message data 920 into a plurality of binary values 922, and further encode each binary value 922 into a minimum value 923 of a fundamental color component or a maximum value 924 of a fundamental color component.

For example, assume that the message data 920 has contents of character "0". According to the American Standard Code for Information Interchange (ASCII) table, the binary value 922 is converted to "0110000$_{(2)}$". The 1$^{st}$ binary value 922 is "0", and is further encoded to be the minimum value 923 of the fundamental color component, e.g., "00000000". The third binary value 922 is "1", and is further encoded to be the maximum value 924 of the fundamental color component, e.g., "11111111".

In the analog channel, "00000000" is first converted to an analog signal representing "value 0"; "11111111" is first converted to an analog signal representing "value 255".

In the transmission process, the analog signal representing "value 0" may change to the analog signal representing "value 5" due to noise interferences, and can nevertheless be recognized as "00000000" as it is not much different from "value 0".

In the transmission process, the analog signal representing "value 255" may change to the analog signal representing "value 240" due to noise interferences, and can nevertheless be recognized as "11111111" as it is not much different from "value 255".

Therefore, with the encoding method in FIG. 5, the transmission unit 200 may be implemented by an analog transmission channel without causing a severe distortion in the message data 920.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An image and message encoding method, comprising:
providing an original image having a first resolution;
providing a message data; and
combining the original image and the message data to be an integrated image having a second resolution;
wherein the second resolution is greater than the first resolution, a fundamental color component of the original image is a red color component, a green color component or a blue color component, the message data includes a plurality of words, and the length of each word of the message data is an integral multiple of that of the fundamental color component of the original image.

2. The encoding method according to claim 1, wherein the integrated image has a length greater than that of the original image, and a width greater than that of the original image.

3. The encoding method according to claim 1, wherein the integrated image has a first area and a second area, the first area and the second area are non-overlapping, the original image is encoded in the first area, and the message data is encoded in the second area.

4. The encoding method according to claim 3, wherein the second area surrounds the first area.

5. The encoding method according to claim 1, wherein the step of combining the original image and the message data further comprises establishing a header data for recording an information of the original image and the message data.

6. The encoding method according to claim 1, wherein in the step of combining the original image and the message data, the message data is converted to be a plurality of binary values, each binary value is further encoded to be a minimum value of the fundamental color component or a maximum value of the fundamental color component.

7. An image and message encoding system, comprising:
an image capturing unit for providing an original image having a first resolution;
a data providing unit for providing a message data; and
an encoding unit for combining the original image and the message data to be an integrated image having a second resolution;
wherein the second resolution is greater than the first resolution, a fundamental color component of the original image is a red color component, a green color component or a blue color component, the message data includes a plurality of words, and the length of each word of the message data is an integral multiple of that of the fundamental color component of the original image.

8. The encoding system according to claim 7, wherein the integrated image has a length greater than that of the original image, and a width greater than that of the original image.

9. The encoding system according to claim 7, wherein the integrated image has a first area and a second area, the first area and the second area are non-overlapping, the original image is encoded in the first area, and the message data is encoded in the second area.

10. The encoding system according to claim 9, wherein the second area surrounds the first area.

11. The encoding system according to claim 7, wherein the encoding unit further establishes a header data for recording an information of the original image and the message data.

12. The encoding system according to claim 7, wherein the encoding unit further encodes the message data to be a plurality of binary values, and encodes each binary value to be a minimum value of the fundamental color component or a maximum value of the fundamental color component.

13. An image and message decoding method, comprising:
receiving an integrated image having a second resolution; and
retrieving an original image and a message data from the integrated image;
wherein the original image has a first resolution, the second resolution is greater than the first resolution, a fundamental color component of the original image is a red color component, a green color component or a blue color component, the message data includes a plurality of words, and the length of each word of the message data is an integral multiple of that of the fundamental color component of the original image.

14. The decoding method according to claim 13, wherein the integrated image has a length greater than that of the original image, and a width greater than that of the original image.

15. The decoding method according to claim 13, wherein the integrated image has a first area and a second area, the first area and the second area are non-overlapping, the original image is encoded in the first area, and the message data is encoded in the second area.

16. The decoding method according to claim 15, wherein the second area surrounds the first area.

17. The decoding method according to claim 15, wherein in the step of retrieving the original image and the message data, an information of the original image and the message data are obtained according to a header data.

18. An image and message decoding system, comprising:
an image inputting unit for receiving an integrated image having a second resolution; and
a decoding unit for retrieving an original image and a message data from the integrated image;
wherein the original image has a first resolution, and the second resolution is greater than the first resolution, a fundamental color component of the original image is a red color component, a green color component or a blue color component, the message data includes a plurality of words, and the length of each word of the message data is an integral multiple of that of the fundamental color component of the original image.

19. The decoding system according to claim 18, wherein the integrated image has a length greater than that of the original image, and a width greater than that of the original image.

20. The decoding system according to claim 18, wherein the integrated image has a first area and a second area, the first area and the second area are non-overlapping, the original image is encoded in the first area, and the message data is encoded in the second area.

21. The decoding system according to claim 20, wherein the second area surrounds the first area.

22. The decoding system according to claim 18, wherein the decoding unit further obtains an information of the original image and the message data according to a header data.

* * * * *